United States Patent
Wang et al.

(10) Patent No.: US 10,271,254 B2
(45) Date of Patent: Apr. 23, 2019

(54) METHODS FOR CONNECTION HANDLING OF AUXILIARY RAT

(71) Applicant: Telefonaktiebolaget L M Ericsson (publ), Stockholm (SE)

(72) Inventors: Yu Wang, Solna (SE); Mattias Bergström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 730 days.

(21) Appl. No.: 14/385,393

(22) PCT Filed: Apr. 3, 2014

(86) PCT No.: PCT/SE2014/050396
§ 371 (c)(1),
(2) Date: Sep. 15, 2014

(87) PCT Pub. No.: WO2014/163566
PCT Pub. Date: Oct. 9, 2014

(65) Prior Publication Data
US 2016/0066232 A1  Mar. 3, 2016

Related U.S. Application Data (60) Provisional application No. 61/808,262, filed on Apr. 4, 2013.

(51) Int. Cl.
*H04W 36/14* (2009.01)
*H04W 76/30* (2018.01)
(Continued)

(52) U.S. Cl.
CPC ....... *H04W 36/14* (2013.01); *H04W 36/0083* (2013.01); *H04W 36/30* (2013.01);
(Continued)

(58) Field of Classification Search
CPC . H04W 36/14; H04W 36/0083; H04W 36/30; H04W 76/046; H04W 76/06;
(Continued)

(56) References Cited

U.S. PATENT DOCUMENTS

| | | | |
|---|---|---|---|
| 2011/0188425 A1* | 8/2011 | Rydnell | H04W 40/00 370/311 |
| 2013/0003652 A1* | 1/2013 | Rados | H04W 48/18 370/328 |
| 2014/0133304 A1* | 5/2014 | Pica | H04W 48/20 370/232 |

FOREIGN PATENT DOCUMENTS

| | | |
|---|---|---|
| EP | 1646189 A1 | 4/2006 |
| EP | 2461631 A2 | 6/2012 |

(Continued)

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.2.0, Dec. 2012, 1-33.

(Continued)

*Primary Examiner* — Walli Z Butt
(74) *Attorney, Agent, or Firm* — Sage Patent Group (57) ABSTRACT

Methods for performing WLAN connection handling when a terminal is in IDLE state in 3GPP are disclosed. An example method for handling connections to two radio access technologies, according to some of the embodiments disclosed herein, is implemented by a mobile terminal and comprises determining (710) that a trigger condition has been satisfied, while the mobile terminal is connected to a first radio access network and in an idle state with respect to a second radio access network. Responsive to this trigger condition, the mobile terminal then automatically establishes or re-establishes (720) a connection to the second (Continued)

radio access network. In some embodiments, the first radio access network is a wireless local area network and the second radio access network is a cellular telecommunications network. More particularly, the wireless local area network may be an IEEE 802.11 network, while the cellular telecommunications network may be a 3GPP network.

7 Claims, 6 Drawing Sheets (51) Int. Cl.
*H04W 76/27* (2018.01)
*H04W 76/16* (2018.01)
*H04W 48/18* (2009.01)
*H04W 36/00* (2009.01)
*H04W 36/30* (2009.01)
*H04W 76/38* (2018.01)
*H04W 88/06* (2009.01)

(52) U.S. Cl.
CPC ............ *H04W 48/18* (2013.01); *H04W 76/16* (2018.02); *H04W 76/27* (2018.02); *H04W 76/30* (2018.02); *H04W 76/38* (2018.02); *H04W 88/06* (2013.01)

(58) Field of Classification Search
CPC ..... H04W 76/27; H04W 76/16; H04W 76/30; H04W 48/18; H04W 76/38; H04W 88/06
USPC ..... 370/232, 311, 328, 331, 338; 455/435.1, 455/436, 552.1
See application file for complete search history.

(56) References Cited

FOREIGN PATENT DOCUMENTS

| WO | 2014043500 A1 | 3/2014 |
|----|---------------|--------|
| WO | 2014084792 A1 | 6/2014 |

OTHER PUBLICATIONS

3GPP, "3rd Generation Partnership Project; Technical Specification Group Radio Access Network; User Equipment (UE) procedures in idle mode and procedures for cell reselection in connected mode (Release 11)", 3GPP TS 25.304 V11.1.0, Dec. 2012, 1-53.

Bergström, et al., "Methods for Inter-RAN Reporting of Communication Status", U.S. Appl. No. 61/731,297, filed Nov. 29, 2012, 1-35.

* cited by examiner

METHODS FOR CONNECTION HANDLING OF AUXILIARY RAT

RELATED APPLICATION

The present application claims the benefit of and priority to U.S. provisional application Ser. No. 61/808,262, filed 4 Apr. 2013, the entire contents of which are incorporated herein by reference.

TECHNICAL FIELD

The present disclosure is generally related to wireless devices that support multiple radio access technologies and more particularly relates to the handling of connections to multiple radio access technologies in these devices.

BACKGROUND

The wireless local-area network (WLAN) technology known as "Wi-Fi" has been standardized by IEEE in the 802.11 series of specifications (i.e., as "*IEEE Standard for Information technology—Telecommunications and information exchange between systems. Local and metropolitan area networks—Specific requirements. Part 11: Wireless LAN Medium Access Control (MAC) and Physical Layer (PHY) Specifications*"). As currently specified, Wi-Fi systems are primarily operated in the 2.4 GHz or 5 GHz bands.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the $3^{rd}$-Generation Partnership Project (3GPP), including the radio-access technologies known as Long-Term Evolution (LTE), Universal Mobile Telecommunications System/Wideband Code-Division Multiple Access, and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi alliance (WFA), activities related to certification of Wi-Fi products are undertaken, which to some extent is also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

For a wireless operator, offering a mix of two technologies that have been standardized in isolation from each other raises the challenge of providing intelligent mechanisms for co-existence. One area that needs these intelligent mechanisms is connection management.

Many of today's portable wireless devices (referred to hereinafter as "user equipment," or "UEs") support Wi-Fi in addition to one or several 3GPP cellular technologies. In many cases, however, these terminals essentially behave as two separate devices, from a radio access perspective. The 3GPP radio access network and the UE-based modems and protocols that are operating pursuant to the 3GPP specifications are generally unaware of the wireless access Wi-Fi protocols and modems that may be simultaneously operating pursuant to the 802.11 specifications. Techniques for coordinated control of these multiple radio-access technologies are needed.

SUMMARY

In the event that a 3GPP radio access network (RAN) is controlling a terminal's connection towards WLAN networks, it is required that the 3GPP RAN has a working connection to the terminal. No such connection exists between a terminal in 3GPP IDLE state and the 3GPP RAN. Hence, it is not possible to control specific terminals that are in 3GPP IDLE state from the RAN. More particularly, it is not possible for the 3GPP RAN to control if and when a specific terminal shall disconnect from a WLAN network.

Embodiments of the present invention include methods for performing WLAN connection handling when a terminal is in IDLE state in 3GPP. These include two embodiments in particular. In a first embodiment the terminal will, based on one or more conditions, establish or re-establish a connection to the 3GPP network. The 3GPP network can, upon establishment or re-establishment, order the terminal to disconnect from the WLAN network. In a second embodiment the terminal will, based on one or more conditions, autonomously disconnect from the WLAN network.

An example method for handling connections to two radio access technologies, according to some of the embodiments disclosed herein, is implemented by a mobile terminal and comprises determining that a trigger condition has been satisfied, while the mobile terminal is connected to a first radio access network and in an idle state with respect to a second radio access network. Responsive to this trigger condition, the mobile terminal then automatically establishes or re-establishes a connection to the second radio access network. In some embodiments of this example method, the first radio access network is a wireless local area network and the second radio access network is a cellular telecommunications network. More particularly, for example, the wireless local area network may be an IEEE 802.11 network, while the cellular telecommunications network may be an LTE network.

Another example method is also implemented by a mobile terminal, and comprises determining that a trigger condition has been satisfied, while the mobile terminal is connected to a first radio access network, such as a WLAN. The mobile terminal may also be in an idle state with respect to a second radio access network, such as a 3GPP network. The method further comprises automatically and autonomously disconnecting from the first radio access network, responsive to the trigger condition.

Other embodiments detailed herein include processing circuit and mobile terminal apparatus configured to carry out one or both of the methods summarized above, and/or variants thereof.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "mobile terminals," "terminals," or "UEs," the latter of which is the 3GPP term for end user wireless devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems. Thus, the term "mobile terminal" or "terminal" should be understood to refer to any of these devices. It should also be noted that the current disclosure relates to end-user wireless devices that support both a wireless local area network (WLAN) technology, such as one or more of the IEEE 802.11 standards, and a wide-area cellular technology, such as any of the wide-area radio access standards maintained by 3GPP. End user devices are referred to in Wi-Fi document as "stations," or "STA"—it should be appreciated that the terms "mobile terminal" and "UE" as used herein should be understood to refer to a STA, and vice-versa, unless the context clearly indicates otherwise.

Some embodiments of the techniques and apparatus disclosed herein are described in the context of a wireless network operating according to one or more of the standards developed by 3GPP, although the inventive techniques disclosed herein are not limited to that context. It will be appreciated that while details of one type of 3GPP network, namely, those networks commonly referred to as Long-Term Evolution (LTE) networks, are provided below, the techniques disclosed herein may be adapted to other 3GPP networks, including those based on standards for GSM and/or W-CDMA.

Figure 1:
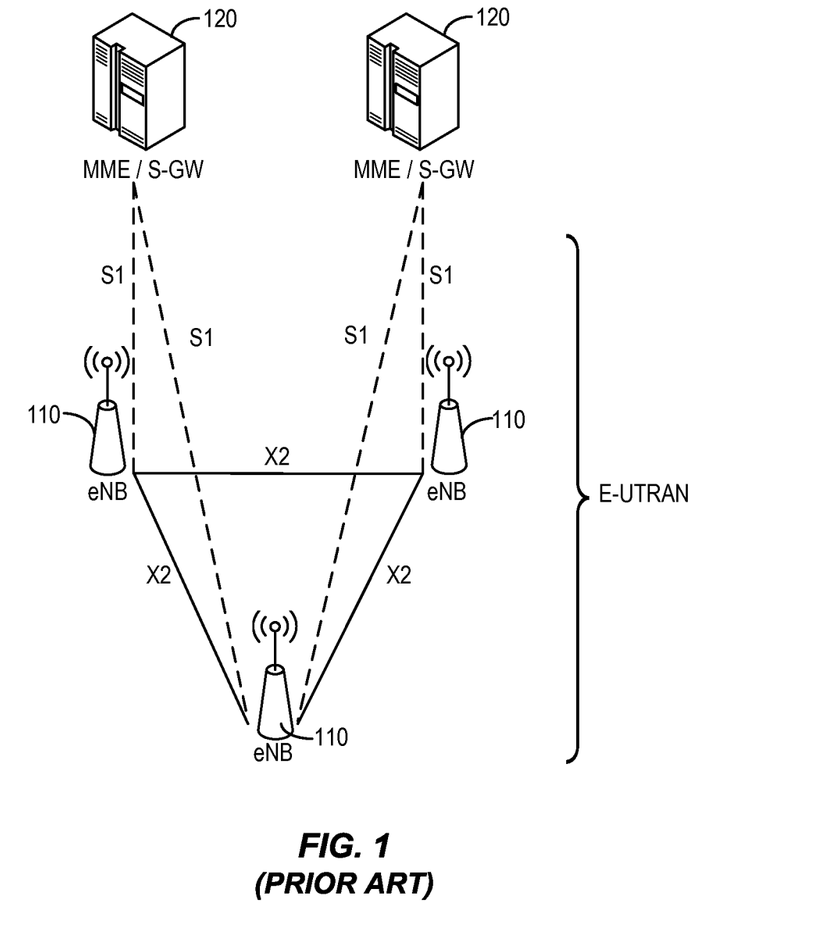
FIG. 1 illustrates the overall E-UTRAN architecture.

The Evolved UMTS Terrestrial Radio Access Network (E-UTRAN), commonly referred to as the LTE network, consists of base stations called enhanced NodeBs (eNBs or eNodeBs), which provide the E-UTRA user plane and control plane protocol terminations towards the User Equipment (UE). The eNBs are interconnected with each other by means of the X2 interface. The eNBs are also connected by means of the S1 interface to the EPC (Evolved Packet Core), more specifically to the MME (Mobility Management Entity), by means of the S1-MME interface, and to the Serving Gateway (S-GW) by means of the S1-U interface. The S1 interface supports many-to-many relations between MMEs/S-GWs and eNBs. FIG. 1 provides a simplified view of the E-UTRAN, as well as components of the Evolved Packet Core (EPC), which provides interconnectivity between the E-UTRAN and public data networks.

As seen in FIG. 1, eNBs 110 communicate with one another by means of the X2 interface, which is defined by a set of communications protocols described by the 3GPP document "Evolved Universal Terrestrial Radio Access Network (E-UTRAN); X2 General Aspects and Principles," 3GPP TS 36.420, v. 11.0.0 (September 2012). The X2 is an IP interface using Stream Control Transmission Protocol (SCTP) as a transport layer. The eNBs 110 are also connected by means of the S1 interface to the EPC, more specifically to MMEs (Mobility Management Entities) 120 by means of the S1-MME interface and to the Serving Gateway (S-GW, not shown in FIG. 1) by means of the S1-U interface. The S1 interface is described in the 3GPP document "Evolved Universal Terrestrial Radio Access Network (E-UTRAN); S1 General Aspects and Principles," 3GPP TS 36.410, v. 11.0.0 (September 2012). The S1 interface supports many-to-many relation between MMEs/S-GWs and eNBs.

The eNBs 110 host functionalities such as Radio Resource Management (RRM), radio bearer control, admission control, header compression of user plane data towards serving gateway, routing of user plane data towards the serving gateway. MMEs 120 are the control nodes that process the signaling between the UE and the core network (CN). The main functions of the MME 120 are related to connection management and bearer management, which are handled via Non Access Stratum (NAS) protocols. The Serving Gateway (S-GW) is the anchor point for UE mobility, and also includes other functionalities such as temporary downlink data buffering while the UE is being paged, packet routing and forwarding of data to the right eNB, gathering of information for charging and lawful interception, etc. The PDN Gateway (P-GW) is the node responsible for IP address allocations to UEs, as well as Quality-of-Service (QoS) enforcement (this is explained in further detail below).

Figure 2:
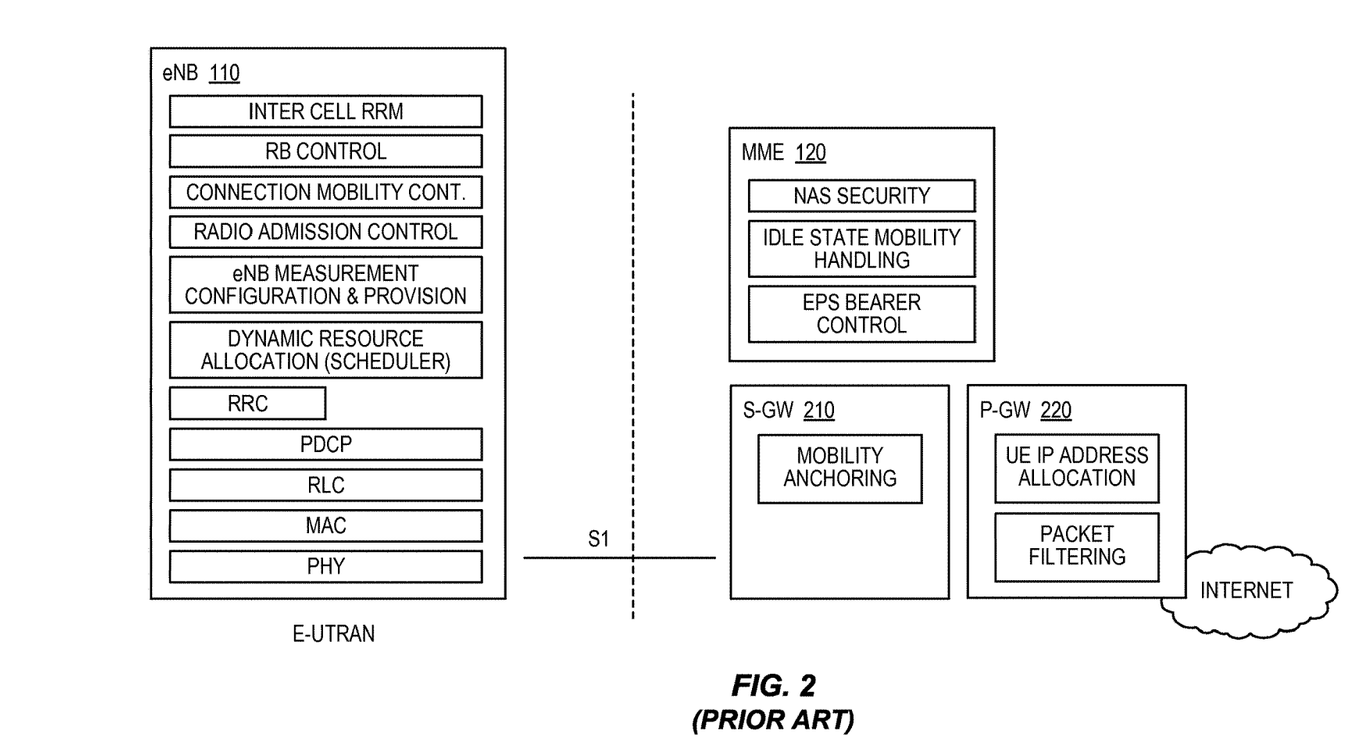
FIG. 2 illustrates the functional split between E-UTRAN and the EPC.

FIG. 2 gives a summary of the functionalities of the eNB 110, MME 120, S-GW 210, and P-GW 220 nodes, and illustrates the functional split between E-UTRAN and the EPC; the reader is referred to 3GPP TS 36.300, v. 11.4.0 (January 2013), and the references therein for the details of the functionalities of the different nodes. Note that in FIG. 2, the larger boxes depict the logical nodes, i.e., the eNB 110, MME 120, S-GW 210, and P-GW 220. The un-shaded boxes therein depict the functional entities of the control plane, while the shaded boxes depict the radio protocol layers.

As noted above, operators of wide-area wireless networks are increasingly interested in the use of Wi-Fi/WLAN (the two terms are used interchangeably throughout this document) to offload traffic from the mobile networks. Increased cooperation between Wi-Fi and mobile networks offer benefits from the end user's point of view as well. Some of the potential advantages are as follows:

Additional frequency: by using Wi-Fi, operators can access an additional 85 MHz of radio bandwidth in the 2.4 GHz band and another (close to) 500 MHz in the 5 GHz band.

Cost: From the operator's point of view, Wi-Fi uses unlicensed frequency that is free of charge. On top of that, the cost of Wi-Fi Access Points (APs), both from capital expense (CAPEX) and operational expenses (OPEX) aspects, is considerably lower than that of a 3GPP base station (BS/eNB). Operators can also take advantage of already deployed APs that are already deployed in hotspots such as train stations, airports, stadiums, shopping malls, etc. Most end users are also currently used to having Wi-Fi for free at home (as home broadband subscriptions are usually flat rate) and public places.

Terminal support: Many User Equipments (UEs), including virtually all smartphones, and other portable devices currently available in the market support Wi-Fi. In the Wi-Fi world, the term Station (STA) is used instead of UE, and as such the terms UE, STA and terminal are used interchangeably in this document.

High data rate: Under low interference conditions and assuming the user is close to the Wi-Fi AP, Wi-Fi can provide peak data rates that outshine that of current mobile networks (for example, theoretically up to 600 Mbps for IEEE 802.11n deployments with MIMO (Multiple Input Multiple Output)).

Figure 3:
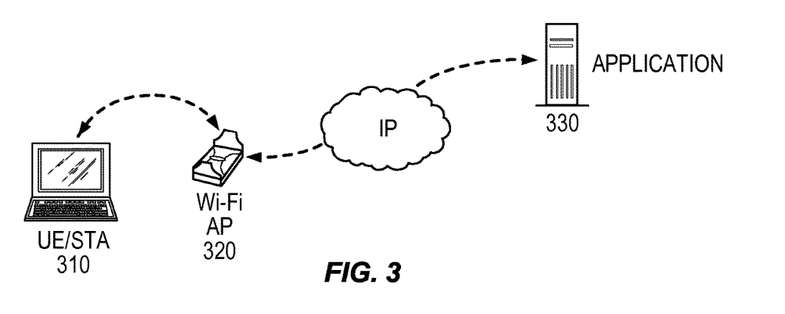
FIG. 3 illustrates the user plane architecture for a Wi-Fi network.
Figure 4:
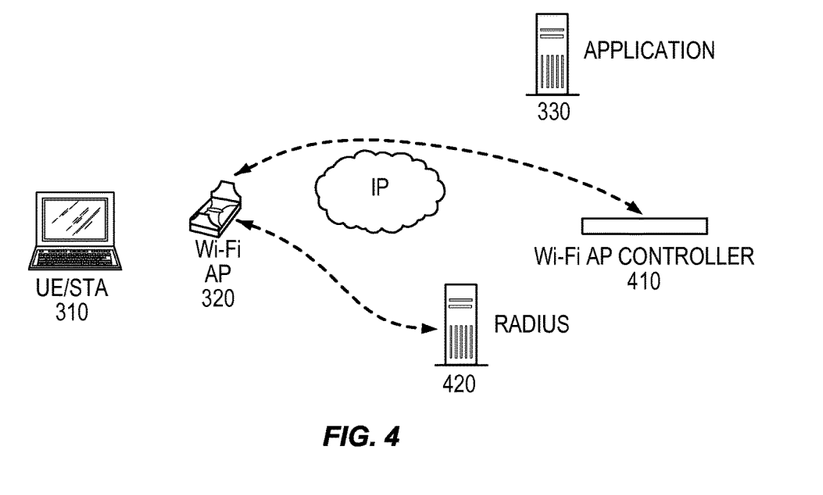
FIG. 4 illustrates the control plane architecture for a Wi-Fi network.

A very simplified Wi-Fi architecture is illustrated in FIG. 3 and FIG. 4, which illustrate the user plane and control plane architectures, respectively. On the user plane (FIG. 3), a very lean architecture is employed, where the UE/STA 310 is connected to the Wi-Fi Access Point (AP) 320, which can directly be connected to the Internet, providing the UE/STA 310 with applications provided by an application server 330. In the control plane (FIG. 4), an Access point Controller (AC) 410 handles the management of the AP. One AC usually handles the management of several APs. Security/authentication of users is handled via an Authentication, Authorization and Accounting (AAA) entity, which is shown as a RADIUS server 420 in FIG. 4. Remote Administration Dial In User Service (RADIUS) is the most widely used network protocol for providing a centralized AAA management (RFC 2865).

In LTE, as in any mobile communication system, a mobile terminal may need to contact the network (via the eNodeB) without having a dedicated resource in the Uplink (from UE to base station). To handle this, a random access procedure is available, whereby a UE that does not have a dedicated UL resource may transmit a signal to the base station. The first message of this procedure is typically transmitted on a special resource reserved for random access, a physical random access channel (PRACH). This channel can for instance be limited in time and/or frequency (as in LTE). The resources available for PRACH transmission are provided to the terminals as part of the broadcasted system information (or as part of dedicated RRC signaling in case of e.g. handover).

Figure 5:
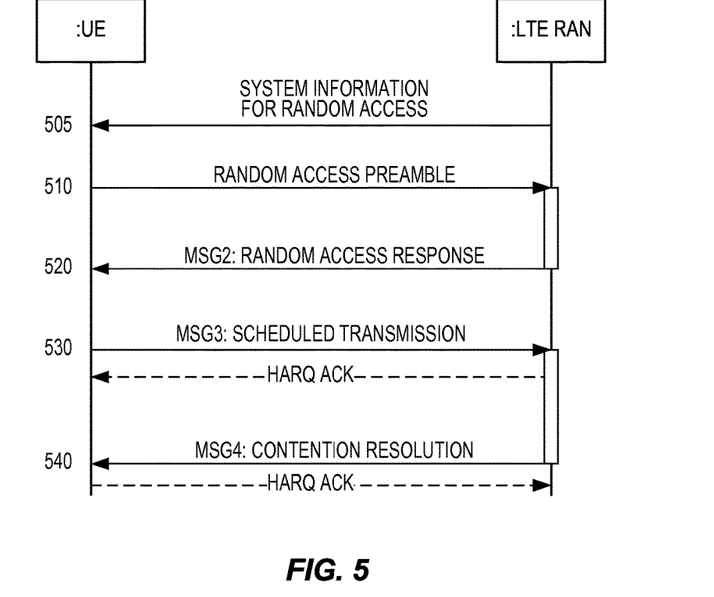
FIG. 5 illustrates an example random access procedure in a 3GPP network.

FIG. 5 illustrates the signaling performed over the air interface for the contention-based random access procedure used in LTE. The UE starts the random access procedure by randomly selecting one of the preambles available for contention-based random access. This selection may be based on system information previously provided to the UE by the RAN, as shown in FIG. 5 at 505. The UE then transmits the selected random access preamble on the physical random access channel (PRACH) to eNode B in the radio access network (RAN), as shown at 510.

The RAN acknowledges any preamble it detects by transmitting a random access response (MSG2), as shown at 520. In the LTE context, this includes an initial grant to be used on the uplink shared channel, a temporary identifier for the mobile terminal (a C-RNTI), and a time alignment (TA) update based on the timing offset of the preamble measured by the eNodeB on the PRACH. The MSG2 is transmitted in the downlink to the UE and its corresponding PDCCH message CRC is scrambled with the RA-RNTI.

After receiving the response, the UE uses the grant to transmit a message MSG3, as shown at 530. The MSG3 is used to trigger the establishment of radio resource control (RRC connection request) and to uniquely identify the UE on the common channels of the cell. The timing alignment command provided in the random access response is applied in the uplink transmission of MSG3. The eNB can change the resources blocks that are assigned for a MSG3 transmission by sending an UL grant with a CRC that is scrambled with the TC-RNTI.

The MSG4, which provides contention resolution, is transmitted by the RAN to the UE, as shown at 540. MSG4 has its PDCCH CRC scrambled with the C-RNTI, if the UE previously has a C-RNTI assigned. If the UE does not have a C-RNTI previously assigned, its PDCCH CRC is scrambled with the TC-RNTI.

Figure 6:
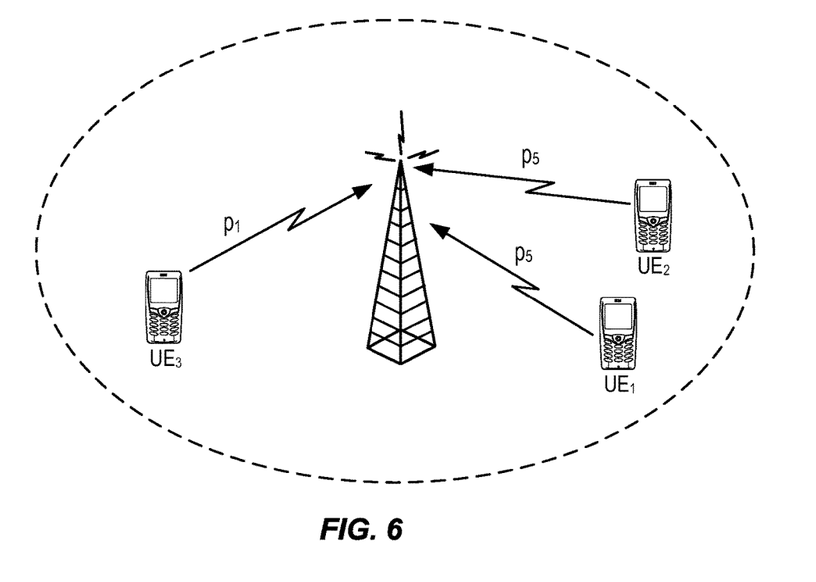
FIG. 6 illustrates a scenario in which random access contention occurs.

The procedure thus ends with the RAN solving any preamble contention that may have occurred for the case that multiple UEs transmitted the same preamble at the same time. This can occur, since each UE randomly selects when to transmit and which preamble to use. If multiple UEs select the same preamble for the transmission on RACH, there will be contention between these UEs that needs to be resolved through the contention resolution message (MSG4). A scenario where contention occurs is illustrated in FIG. 6, where two UEs transmit the same preamble, $p_5$, at the same time. A third UE also transmits at the same RACH, but since it transmits with a different preamble, $p_1$, there is no contention between this UE and the other two UEs.

As noted above, many smartphones on the market today support Wi-Fi connectivity (or, more generally, WLAN connectivity), in addition to supporting one or more cellular radio-access technologies (RATs), such as the several RATs standardized by 3GPP. For some expected solutions for 3GPP/WLAN interworking, it is anticipated that the 3GPP radio access network (RAN), or some other part of the 3GPP network, will be in control of when a terminal connects/disconnects with a WLAN network. This control may be exercised, for example, through the use of connection/disconnection orders sent from the 3GPP network to the terminals. If the 3GPP network judges that a terminal should be served by a WLAN network, for example to improve user experience or system performance, the 3GPP network may order the terminal to connect to the WLAN network. To save power the 3GPP network may then terminate the connection between the 3GPP RAN and the terminal, e.g. putting the terminal to an IDLE state in 3GPP.

In such a case, however, it is necessary that there be a connection between the 3GPP network and the terminal, so that these commands can be sent from the 3GPP network to the terminal. When the terminal is in IDLE state in a 3GPP network, the 3GPP RAN has no information about the terminal's state nor does it have any connection to the terminal. Hence, there is currently no way in these networks to send messages/commands to the terminal.

For the 3GPP network to establish or re-establish a connection to the terminal, a paging message would normally be sent to the terminal. However, paging messages are sent from the 3GPP core network, not the 3GPP RAN. This means that if the 3GPP RAN has ordered the terminal to connect to WLAN and then put the terminal in IDLE state, there is no way for the 3GPP RAN itself to order the terminal to disconnect from the WLAN network.

Described below are several embodiments for WLAN connection handling for terminals in 3GPP IDLE state, whereby the terminal evaluates one or more conditions and takes associated actions. 3GPP and WLAN networks are used as examples of different radio access technologies (RATs) in this document, but it should be appreciated that the methods described herein can be applied also to other combinations of interworking between different RATs. Likewise, while it is herein discussed that the terminal is in IDLE state (as defined in 3GPP specifications 3GPP TS 25.304, v. 11.1.0 and 3GPP TS 36.304, v. 11.2.0), other RATs may have states similar to this state.

Some of the embodiments detailed below are methods for performing WLAN connection handling when a terminal is in IDLE state in 3GPP. These include two embodiments in particular. In a first embodiment the terminal will, based on one or more conditions, (re)establish a connection to the 3GPP network. The 3GPP network can, upon (re)establishment, order the terminal to disconnect from the WLAN network. In a second embodiment the terminal will, based on one or more conditions, autonomously disconnect from the WLAN network.

According to some embodiments, the terminal will (re)start a timer upon each data transmission/reception in WLAN. Upon expiry of this timer, the terminal will connect to the 3GPP network. The 3GPP network can then indicate whether or not the terminal shall disconnect from the WLAN network. So, for example, if a terminal has not been using its WLAN connection for the past five minutes, the terminal will connect to the 3GPP network which can then order the terminal to disconnect from the WLAN network, if the 3GPP network judges it to be appropriate.

In the subsections that follow, several embodiments are described in further detail, these descriptions illustrating terminal behavior that can be used to realize WLAN connection handling for a terminal which is in 3GPP IDLE state while having a WLAN connection. In each of these embodiments, a terminal performs certain actions upon fulfillment of one or more conditions, where example conditions are described below. According to some of these embodiments, a terminal's connection to a 3GPP radio access network (RAN) is established or re-established, in response to the satisfaction of one or more of these conditions. According to other embodiments, the terminal autonomously performs WLAN disconnection in response to the satisfaction of one or more conditions.

In some systems according to these techniques, both approaches can be used in the same system. In some of these embodiments, which of the procedures the terminal follows (or whether either is followed) can be terminal-specific. In some cases, the behavior of a particular terminal may be configured by the 3GPP network. This configuration, which may be handled by Radio Resource Control (RRC) signaling, for instance, may be performed, for example, upon the terminal's initial access to the 3GPP network. Alternatively, the mobile terminal may be configured before the connection between the 3GPP RAN and the terminal is terminated, e.g., before the terminal is put into IDLE mode in 3GPP.

3GPP Connection Establishment or Re-Establishment

In some embodiments, a terminal that is in 3GPP IDLE state while connected to a WLAN establishes or reestablishes a connection to the 3GPP RAN based on the fulfillment of one or more conditions. The (re)establishment of the connection to the 3GPP RAN can be done, for example, by the terminal performing a RRC Connection Request to the 3GPP RAN.

Upon (re)establishment of the connection to the 3GPP RAN, the 3GPP RAN can use any of several techniques to obtain the terminal's WLAN connection status. For example, a network node may explicitly request the mobile terminal to send a report that indicates the terminal's WLAN connection status. This may be done by a base station, such as an eNodeB in an LTE network. However, it may also be initiated by another node in a network, such as a scheduling node or controller node that is separate from a radio base station, in which case communication with the mobile terminal is typically carried out via a radio base station. In some cases, the network node may send the mobile terminal information that specifies all or part of the desired report contents. However, all or part of the contents may be determined by the mobile terminal, based on current conditions, or may be specified by an industry standard. Once the network node receives a report from the mobile terminal, the report characterizing a connection status for the mobile terminal with respect to a second RAN, such as a WiFi network, the network node can evaluate the report, e.g., in conjunction with information about conditions at the 3GPP RAN, such as network or base station loading conditions. Responsive to this evaluation and depending on the information conveyed by the report from the mobile terminal, the network node may proceed by steering traffic for the mobile terminal to or from the WLAN, or by prioritizing scheduling for one or more mobile terminals, or both. More generally, upon receiving the terminal's WLAN connection status, the 3GPP RAN can take one or more of the below example actions:

send a WLAN disconnection-command to the terminal; and/or update the conditions, or parameters related to the conditions, which trigger the (re)establishment, and/or move the terminal (back) to an idle state with respect to the 3GPP RAN.

One benefit of the techniques for establishment/re-establishment discussed above is that the 3GPP RAN can, once the connection between the 3GPP RAN and the terminal has been (re)established, order the terminal to disconnect from the WLAN network, if deemed suitable by the 3GPP RAN. This provides the 3GPP RAN with control over a terminal's WLAN connection.

The 3GPP RAN does not generally know the status (e.g., traffic situation, quality of experience in WLAN, etc.) of the IDLE state terminals, which means that the 3GPP RAN is not able to know when a (re)establishment is necessary. Thus, the mobile terminal is in a better position to make an autonomous decision to connect or re-connect to the 3GPP network. As explained above, the 3GPP RAN is not capable of communicating with an IDLE state terminal and hence it is not possible for the RAN to send control-commands to an IDLE state terminal. With the techniques described above, a connection between the 3GPP RAN and the terminal can be established based on information about the terminal that the 3GPP RAN is not aware of.

Terminal Autonomous WLAN Disconnection

In some embodiments, a mobile terminal will autonomously disconnect from the WLAN network upon fulfillment of one or more conditions. This approach allows the terminal to disconnect from WLAN network without needing to first connect to the 3GPP RAN. This can reduce the time delay for disconnecting, as well as the amount of signaling needed.

A mobile terminal may be configured further so that if it has autonomously disconnected from the WLAN network, as described above, it can autonomously re-connect to WLAN in the event that data traffic should be served. In these embodiments, even if the terminal usually follows orders from the 3GPP RAN with regards to WLAN connection/disconnection, it may reconnect to the WLAN network if it has earlier autonomously disconnected from the WLAN network. In some of these embodiments, the terminal may be configured to only reconnect to the same WLAN network as it has autonomously disconnected from, or it may be configured so that it can connect to another WLAN network fulfilling a set of requirements, e.g., being part of the same or equivalent Public Land Mobile Network (PLMN), having the same SSID or BSSID, etc. The terminal may alternatively be configured so that it can connect to any WLAN network. Which network the terminal is configured to reconnect to may be configured by the 3GPP or WLAN network, or it may be specified in a specification, or it can be decided autonomously by the terminal.

Note that in some cases this behavior may be applied also to the case where the terminal is actively connected to the 3GPP RAN. In other words, in some embodiments the terminal may be configured to autonomously disconnect from the WLAN, upon fulfillment of one or more conditions, without regard to whether or not it is connected to the 3GPP RAN at the time.

Trigger Conditions

Example trigger conditions which the terminal evaluates, for the purposes of either establishing/re-establishing a working condition with a 3GPP or autonomously disconnecting from a WLAN, are described in the below sections.

Traffic Activity—One possible trigger condition for either of the approaches described above is satisfied when the terminal has not received or transmitted any data over the WLAN for a period of time T. This may be implemented by the terminal maintaining a timer which is started or restarted upon reception or transmission of data over WLAN. The timer may also be started or restarted upon entering idle state with respect to the 3GPP RAN, in some embodiments. The timer can either be started at value 0 and count upwards towards value T where it expires, or it can be started at value T and count downwards towards 0 where it expires. Upon expiry of this timer, this trigger condition is considered to be met.

The value T will affect the performance of the terminal in several ways. If the value T is set to a short value, the terminal could potentially be disconnected from the WLAN earlier than if the value T is set to a long value, where the terminal will be connected to WLAN a longer time even without ongoing traffic. If the terminal is maintaining the WLAN connection for a long time (large T) without any ongoing traffic, there will be unnecessary power consumption due to maintaining the WLAN connection. On the other hand, if the terminal is configured to disconnect after a relatively short time without ongoing traffic (short T), then terminal power will be saved. However, the terminal will need to perform another WLAN connection procedure if the terminal shall later continue to use the WLAN, which will add extra delay.

This value T can be configured in different ways such as:
  configured by the network where the value T is signaled to the terminal (e.g. broadcasted or unicasted);
  predefined, for example specified in a specification; and/or
  autonomously configured by the terminal, if, for example, one terminal wants to save power and may then set the value T to a low value.

The terminal may maintain different timer for uplink and downlink respectively and the terminal would then restart the timer associated with uplink when uplink traffic is transmitted and restart the timer associated with download when downlink traffic is received. These timers may apply different timer valued, e.g., T_Uplink and T_Downlink.

It should be noted here the events of receiving or transmitting data may be defined with respect to any one or more of several different layers such as the link layer, transport layer, etc. Acknowledgments may or may not be considered to be "data," for the purposes of evaluating a particular trigger condition, depending on the specific embodiment.

Channel conditions—Another possible trigger condition for either of the approaches described earlier is satisfied if the terminal's WLAN channel quality and/or signal strength falls below a certain threshold. For example, if a measured Received Signal Strength Indicator (RSSI) is particularly low, it may not make much sense to be connected to the WLAN network.

The quality and/or signal strength measurements can be averaged over a period of time so as to avoid that a terminal considers this condition met simply because the instantaneous quality and/or signal strength is very low. For example, fading can create rapid fluctuations in radio quality and/or signal strength and in so called "fading dips" the instantaneous radio quality and/or signal strength may be very low, while the average radio quality and/or signal strength is still good.

Load conditions—It the load of WLAN is above a threshold, users may have bad quality of service in WLAN. The load may be included as one of the conditions triggering the action. The load measure may be averaged over a period of time in order to avoid triggering the action only due to a short peak of high load which may not have impact to service quality.

Quality-of-service conditions—A mobile terminal may measure the quality of service it experiences in WLAN. Examples of quality-of-service measures include throughput, packet loss, latency, video buffering time, video re-buffering statistics, etc. These measures may be used as trigger the operations discussed above as well.

Combination of conditions—In some embodiments, a terminal may require more than one condition when determining whether the actions described above should be performed. The conditions can be combined with logical operators such as OR, AND, etc. In one example, the terminal may perform the actions when either no data has been received or transmitted for the past time T OR the channel quality falls below a certain threshold.

Example Event Flow

Below is illustrated a flow of events where one example embodiment of this invention is applied. The order of the events is just an example, and some events could be done in a different order.

1. The 3GPP network indicates that the terminal shall connect to a WLAN network.
2. The 3GPP network signals a value T=3 minutes to the terminal which indicates how long the terminal should wait without transmitting or receiving data to/from a WLAN network before it (re)establishes a connection to the 3GPP network.
3. The terminal connects to, and is served by, a WLAN network.
4. The terminal enters the 3GPP IDLE state.
5. The terminal does not transmit or receive data to/from the WLAN network for 3 minutes.
6. The terminal (re)establishes a connection to the 3GPP RAN (e.g., entering CONNECTED mode in case of LTE).
7. The terminal indicates to the 3GPP RAN its WLAN traffic status.
8. The 3GPP RAN signals to the terminal that it shall disconnect from the WLAN network.

Figure 7:
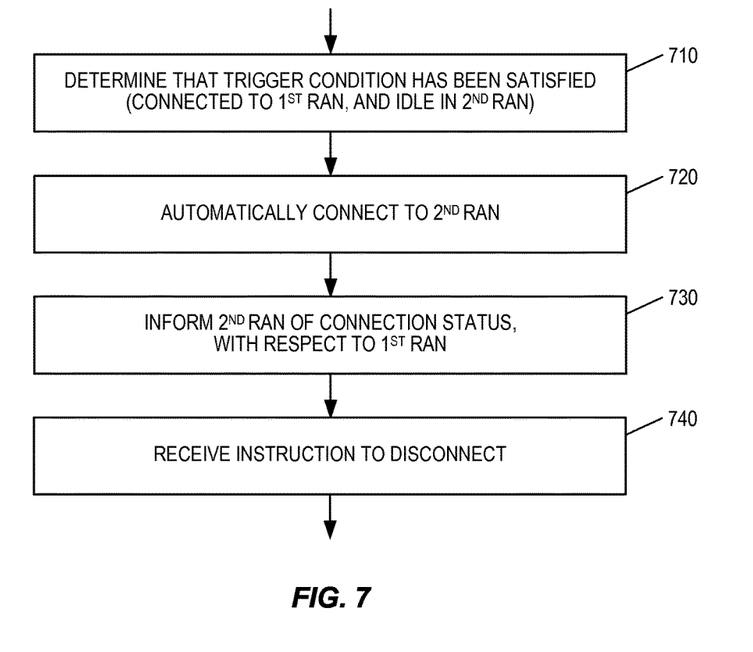
FIG. 7 is a process flow diagram illustrating an example method for handling connections to two radio access technologies.

FIG. 7 is a process flow diagram illustrating a method, in a mobile terminal, for handling connections to two radio access technologies. It will be appreciated that the illustrated method is a generalization of the techniques detailed above.

As shown at block 710, the illustrated method begins with determining that a trigger condition has been satisfied, while connected to a first radio access network and in an idle state with respect to a second radio access network. As shown at block 720, the method continues with automatically establishing or reestablishing a connection to the second radio access network, responsive to the trigger condition. The first radio access network may be a WLAN, for example, while the second radio may be a cellular telecommunications network. For instance, the first radio access network is an IEEE 802.11 network, while the second radio access network is an LTE network, in some embodiments.

In some embodiments, as shown at block 730, the method continues with informing the second radio access network of a connection status for the mobile terminal, with respect to the first radio access network. In some cases, this is followed by receiving from the second radio access network, after said establishing or reestablishing of the connection, an instruction to disconnect from the first radio access network, as shown at block 740. This instruction to disconnect may be, but is not necessarily, in response to the reported connection status. Of course, neither of these operations necessarily appears in every embodiment or in every instance.

In any of these or in other embodiments, the mobile terminal may receive from the second radio access network, after said establishing or reestablishing of the connection, an update of trigger conditions for subsequent reestablishments of connections to the second radio access network, and/or an update of one or more parameters related to such trigger conditions. In some embodiments, the mobile terminal may receive, after establishing or reestablishing of the connection, an instruction to re-enter idle state with respect to the second radio access network.

As described above, various trigger conditions may apply. For instance, satisfaction of the trigger condition may require that at least one of the following is satisfied:
  data traffic to and/or from the first radio access network is inactive for a predetermined period of time;
  a monitored channel quality and/or signal strength parameter falls below a predetermined threshold;
  a monitored channel quality and/or signal strength parameter falls below a predetermined threshold for a predetermined period of time;
  a measure of loading on the first radio access network exceeds a predetermined threshold;
  a measure of loading on the first radio access network exceeds a predetermined threshold for a predetermined period of time;
  a quality of service metric is above or below a predetermined threshold; and
  a quality of service metric is above or below a predetermined threshold for a predetermined period of time.

Figure 8:
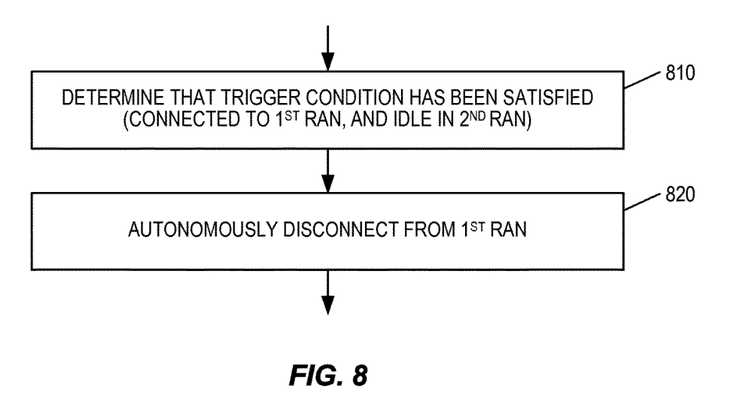
FIG. 8 is a process flow diagram illustrating another example method for handling connections to two radio access technologies.

FIG. 8 is a process flow diagram illustrating a related method, also implemented in a mobile terminal, for handling connections to two radio access technologies. This method begins, as shown at block 810, with determining that a trigger condition has been satisfied, while connected to a first radio access network and in an idle state with respect to a second radio access network. As shown at block 820, however, this method continues with automatically and autonomously disconnecting from the first radio access network, responsive to the trigger condition.

Note that while FIG. 8 indicates that the trigger condition is detected while the mobile terminal is in an idle state with respect to the second radio access network, this need not be the case in every embodiment. In other words, in some embodiments the mobile terminal may be configured to autonomously disconnect from the first radio access network, upon fulfillment of one or more conditions, without respect to whether it is connected to the second radio access network at the time.

In some embodiments, the method may further comprise subsequently reconnecting to the first radio access network. This may be triggered, for example, by a change in one or more of the conditions that led to the autonomous disconnection in the first place. Alternatively, the method in some embodiments may further comprise subsequently connecting to a third radio access network of the same radio access type as the first radio access network. This subsequent connection may be conditioned upon the third radio access network having an identity meeting one or more requirements, in some embodiments, such as one or more of:

- the third radio access network being part of the same Public Land Mobile Network (PLMN) as the first radio access network; and
- the third radio access network having the same service set identifier (SSID) as the first radio access network.

In some embodiments, the subsequent connection to the first or third radio access networks, as described above, is triggered by a need for sending new data.

In some embodiments, satisfaction of the trigger condition (as shown at block 810 of FIG. 8) requires that at least one of the following is satisfied: data traffic to and/or from the first radio access network is inactive for a predetermined period of time; a monitored channel quality parameter is below a predetermined threshold; a monitored channel quality parameter is below a predetermined threshold for a predetermined period of time; a measure of loading on the first radio access network is above a predetermined threshold; a measure of loading on the first radio access network is above a predetermined threshold for a predetermined period of time; a quality of service metric is above or below a predetermined threshold; and a quality of service metric is above or below a predetermined threshold for a predetermined period of time.

As was the case with FIG. 7, in any of the embodiments described in connection with FIG. 8, the first radio access network may be a wireless local area network while the second radio access network is a cellular telecommunications network. For instance, the wireless local area network is an IEEE 802.11 network and the cellular telecommunications network is an LTE network, in some embodiments.

It will further be appreciated that variations of the processes described in connection with FIG. 7 are also applicable to the process illustrated generally in FIG. 8. Further, all or portions of the processes described in connection with FIG. 7 may be combined with any of those described in connection with FIG. 8, in some embodiments. Thus, for example, in some embodiments the method illustrated in FIG. 8 may be followed by the mobile terminal subsequently connecting to the second radio access network, and in some cases informing the second radio access network of a connection status for the mobile terminal, with respect to the first radio access network. In some embodiments, the mobile terminal then receives from the second radio access network an update of trigger conditions for subsequent autonomous disconnections from the first radio access network or radio access networks of the same radio access type as the first radio access network, or an update of one or more parameters related to such trigger conditions, or a combination of both.

Hardware Implementations

Figure 9:
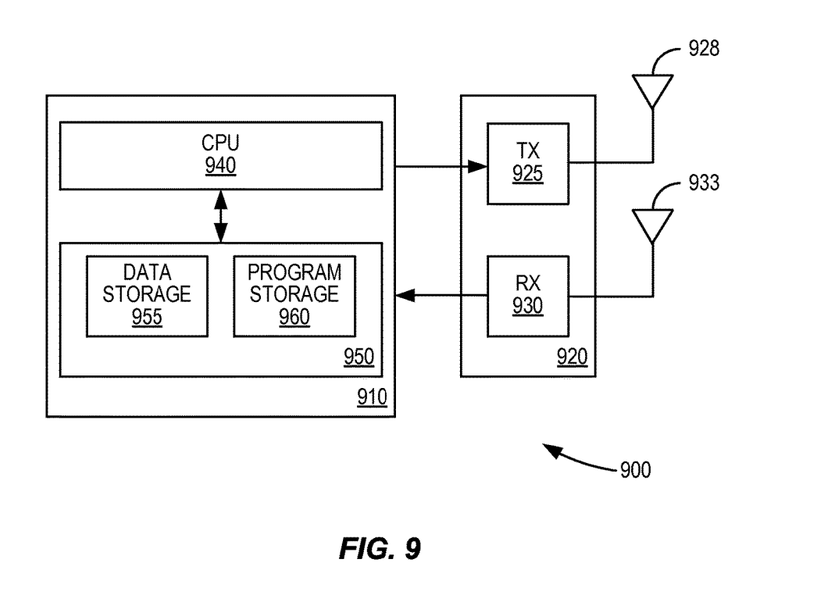
FIG. 9 is a block diagram illustrating components of an example mobile terminal.

Several of the techniques and methods described above may be implemented using radio circuitry and electronic data processing circuitry provided in a terminal. FIG. 9 illustrates features of an example terminal 900 according to several embodiments of the present invention. Terminal 900, which may be a UE configured for operation with an LTE network (E-UTRAN) and that also supports Wi-Fi, for example, comprises a transceiver unit 920, which includes radio circuitry adapted for handling connections to two radio access technologies, e.g., for communicating with one or more base stations in a 3GPP network and for communicating with an access point in a WLAN. Terminal 900 also includes a processing circuit 910 for processing the signals transmitted and received by the transceiver unit 920. Transceiver unit 920 includes a transmitter 925 coupled to one or more transmit antennas 928 and receiver 930 coupled to one or more receiver antennas 933. The same antenna(s) 928 and 933 may be used for both transmission and reception. Receiver 930 and transmitter 925 use known radio processing and signal processing components and techniques, typically according to a particular telecommunications standard such as the 3GPP standards for LTE. Note also that transmitter unit 920 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 910 comprises one or more processors 940 coupled to one or more memory devices 950 that make up a data storage memory 955 and a program storage memory 960. Processor 940, identified as CPU 940 in FIG. 9, may be a microprocessor, microcontroller, or digital signal processor, in some embodiments. More generally, processing circuit 910 may comprise a processor/firmware combination, or specialized digital hardware, or a combination thereof. Memory 950 may comprise one or several types of memory such as read-only memory (ROM), random-access memory, cache memory, flash memory devices, optical storage devices, etc. Because terminal 900 supports multiple radio access networks, processing circuit 910 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 910 include modulation and coding of transmitted signals and the demodulation and decoding of received signals. In several embodiments of the present invention, processing circuit 910 is adapted, using suitable program code stored in program storage memory 960, for example, to carry out one or more of the techniques described above, including any one or more of the methods discussed in connection with FIGS. 7 and 8. Of course, it will be appreciated that not all of the steps of these techniques are necessarily performed in a single microprocessor or even in a single module.

Figure 10:
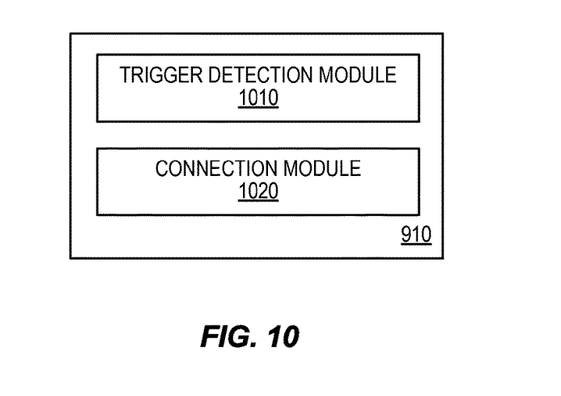
FIG. 10 illustrates an alternative representation of a processing circuit.

It will be appreciated that the processing circuit 910, as adapted with program code stored in memory 950, can implement the process flows of FIG. 7 or 8 (or variants thereof) using an arrangement of functional "modules," where the modules are computer programs or portions of computer programs executing on the processor circuit 910. Thus, the apparatus 900 can be understood as comprising several functional modules implemented with processing circuitry 910, including memory 950. These functional modules might include, for example, a trigger detection module 1010 and a connection module 1020, as shown in the alternative representation of processing circuitry 910 shown in FIG. 10.

In some embodiments, e.g., in embodiments configured to carry out the method of FIG. 7 or variants thereof, the trigger detection module 1010 is configured to determine that a trigger condition has been satisfied, while the mobile terminal is connected to a first radio access network and in an idle state with respect to a second radio access network. The connection module 1020, in these embodiments, is configured to automatically establish or reestablish a connection to the second radio access network, responsive to the trigger condition. In other embodiments, e.g., in embodiments configured to carry out the method of FIG. 8 or variants thereof, the trigger detection module 1010 is configured to determine that a trigger condition has been satisfied, while the mobile terminal is connected to a first radio access network, while the connection module 1020 is configured to automatically and autonomously disconnect from the first radio access network, responsive to the trigger condition, Accordingly, in various embodiments of the disclosed techniques and apparatus, processing circuits, such as the processing circuit 910 and its corresponding memory 950, are configured to carry out one or more of the techniques described in detail above. Other embodiments may include a mobile terminal that includes such a processing circuit. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present invention. For example, although embodiments of the present invention have been described with examples that include a communication system compliant to the 3GPP specified LTE standard specification, it should be noted that the solutions presented may be equally well applicable to any other 3GPP specified technology in combination with 802.11 specifications. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The presently disclosed embodiments are thus to be considered in all respects as illustrative and not restrictive.

What is claimed is:

1. A method, in a mobile terminal, for handling connections to two radio access technologies, the method comprising:
while connected to a first radio access network and in an idle state with respect to a second radio access network, determining that a first trigger condition has been satisfied; responsive to said first trigger condition, automatically establishing or reestablishing a connection to the second radio access network; and receiving from the second radio access network, after said establishing or reestablishing of the connection, an instruction to disconnect from the first radio access network.

2. A method, in a mobile terminal, for handling connections to two radio access technologies, the method comprising:
while connected to a first radio access network and in an idle state with respect to a second radio access network, determining that a first trigger condition has been satisfied; responsive to said first trigger condition, automatically establishing or reestablishing a connection to the second radio access network; receiving from the second radio access network, after said establishing or reestablishing of the connection, an instruction to disconnect from the first radio access network; and informing the second radio access network of a connection status for the mobile terminal with respect to the first radio access network, after said establishing or reestablishing of the connection, wherein said receiving of the instruction to disconnect is responsive to said informing.

3. A method, in a mobile terminal, for handling connections to two radio access technologies, the method comprising:
while connected to a first radio access network and in an idle state with respect to a second radio access network, determining that a first trigger condition has been satisfied; responsive to said first trigger condition, automatically establishing or reestablishing a connection to the second radio access network; responsive to said first trigger condition, automatically and autonomously disconnecting from the first radio access network; subsequently connecting to a third radio access network of the same radio access type as the first radio access network; wherein said subsequently connecting is conditioned upon the third radio access network having an identity meeting one or more requirements; and wherein said one or more requirements include one or more of: the third radio access network being part of the same Public Land Mobile Network, PLMN, as the first radio access network; and the third radio access network having the same service set identification, SSID, as the first radio access network.

4. A method, in a mobile terminal, for handling connections to two radio access technologies, the method comprising:
while connected to a first radio access network, determining that a trigger condition has been satisfied; and, responsive to said trigger condition, automatically and autonomously disconnecting from the first radio access network; subsequently connecting to a third radio access network of the same radio access type as the first radio access network; wherein said subsequently connecting is conditioned upon the third radio access network having an identity meeting one or more requirements; wherein said subsequently connecting is conditioned upon the third radio access network having an identity meeting one or more requirements; wherein said one or more requirements include one or more of:

the third radio access network being part of the same Public Land Mobile Network, PLMN, as the first radio access network; and the third radio access network having the same service set identification, SSID, as the first radio access network.

5. A mobile terminal apparatus comprising radio circuitry adapted to handle connections to two radio access technologies and a processing circuit, wherein the processing circuit is adapted to: while connected to a first radio access network and in an idle state with respect to a second radio access network, determine that a first trigger condition has been satisfied; and, responsive to said first trigger condition, automatically establish or reestablish a connection to the second radio access network wherein the processing circuit is further adapted to receive from the second radio access network, after said establishing or reestablishing of the connection, an instruction to disconnect from the first radio access network.

6. A mobile terminal apparatus comprising radio circuitry adapted to handle connections to two radio access technologies and a processing circuit, wherein the processing circuit is adapted to: while connected to a first radio access network and in an idle state with respect to a second radio access network, determine that a first trigger condition has been satisfied; and, responsive to said first trigger condition, automatically establish or reestablish a connection to the second radio access network, wherein the processing circuit is further adapted to, responsive to said first trigger condition, automatically and autonomously disconnect from the first radio access network, wherein the processing circuit is further adapted to subsequently connect to a third radio access network of the same radio access type as the first radio access network, wherein the processing circuit is further adapted to condition said connection upon the third radio access network having an identity meeting one or more requirements, and wherein said one or more requirements include one or more of: the third radio access network being part of the same Public Land Mobile Network, PLMN, as the first radio access network; and the third radio access network having the same service set identification, SSID, as the first radio access network.

7. A mobile terminal apparatus comprising radio circuitry adapted to handle connections to two radio access technologies and a processing circuit, wherein the processing circuit is adapted to: while connected to a first radio access network, determine that a trigger condition has been satisfied; and, responsive to said trigger condition, automatically and autonomously disconnect from the first radio access network, wherein the processing circuit is further adapted to subsequently connect to a third radio access network of the same radio access type as the first radio access network, wherein the processing circuit is further adapted to condition said connection upon the third radio access network having an identity meeting one or more requirements, wherein said one or more requirements include one or more of: the third radio access network being part of the same Public Land Mobile Network, PLMN, as the first radio access network; and the third radio access network having the same serving set identification, SSID, as the first radio access network.

* * * * *